United States Patent
Bengtsson et al.

(10) Patent No.: US 6,356,942 B1
(45) Date of Patent: Mar. 12, 2002

(54) INTEGRATED CIRCUIT AND METHOD FOR BRINGING AN INTEGRATED CIRCUIT TO EXECUTE INSTRUCTIONS

(75) Inventors: Jan Bengtsson; Hans-Peter Nilsson; Kenny Ranerup; Ronny Ranerup; Per Zander, all of Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 09/162,681

(22) Filed: Sep. 29, 1998

(30) Foreign Application Priority Data

May 13, 1998 (SE) .............................. 9801671

(51) Int. Cl.[7] ........................ G06F 15/16; G06F 15/177
(52) U.S. Cl. ...................... 709/220; 709/219; 709/221; 709/222; 709/250
(58) Field of Search ................................ 709/201, 200, 709/219, 250, 220, 221, 222; 370/85; 712/1

(56) References Cited

U.S. PATENT DOCUMENTS

| | | | |
|---|---|---|---|
| 4,752,870 A | 6/1988 | Matsumura | 364/200 |
| 5,109,484 A | 4/1992 | Hughes et al. | 395/200 |
| 5,146,568 A | 9/1992 | Flaherty et al. | 395/325 |
| 5,280,627 A | 1/1994 | Flaherty et al. | 395/700 |
| 5,331,634 A * | 7/1994 | Fischer | 370/85 |
| 5,367,688 A | 11/1994 | Croll | 395/700 |
| 5,404,527 A | 4/1995 | Irwin et al. | 395/700 |
| 5,504,903 A | 4/1996 | Chen et al. | 395/700 |
| 5,603,056 A | 2/1997 | Totani | 395/828 |
| 5,613,123 A | 3/1997 | Tsang et al. | 395/651 |
| 5,652,886 A | 7/1997 | Tulpule et al. | 395/652 |
| 5,657,448 A | 8/1997 | Wadsworth et al. | 395/200.5 |
| 5,668,992 A | 9/1997 | Hammer et al. | 395/651 |
| 5,727,207 A | 3/1998 | Gates et al. | 395/651 |
| 5,790,788 A * | 8/1998 | Badovinatz et al. | 709/201 |
| 5,838,907 A * | 11/1998 | Hansen | 709/200 |
| 5,980,078 A * | 11/1999 | Krivoshein et al. | 364/131 |
| 6,012,088 A * | 1/2000 | Li et al. | 709/219 |
| 6,012,100 A * | 1/2000 | Frailong et al. | 709/250 |
| 6,105,122 A * | 8/2000 | Muller et al. | 712/1 |

FOREIGN PATENT DOCUMENTS

| | | | |
|---|---|---|---|
| EP | 0 313 848 | 5/1989 | G06F/11/00 |
| EP | 0 402 759 | 12/1990 | G07F/7/10 |
| EP | 0 464 433 | 1/1992 | G06F/9/44 |
| WO | WO 97/38367 | 10/1997 | G06F/9/06 |

* cited by examiner

Primary Examiner—Mark H. Rinehart
Assistant Examiner—Paul Kang
(74) Attorney, Agent, or Firm—Cary & Kelly, LLP; Charles C. Cary

(57) ABSTRACT

An integrated circuit comprises a CPU, ports for external communication, a memory means and a switching means for converting the circuit between a working mode and an initiating mode. The circuit is in itself, in the initiating mode, adapted to receive an initiating signal, comprising external instructions, and to bring the CPU to execute said instructions.

According to a method for bringing the integrated circuit to execute instructions, the integrated circuit is in a first step brought into the initiating mode. Thereafter the circuit receives said external signal and uses the integrated CPU to execute said instructions.

10 Claims, 11 Drawing Sheets

SERVER DOWNLOAD

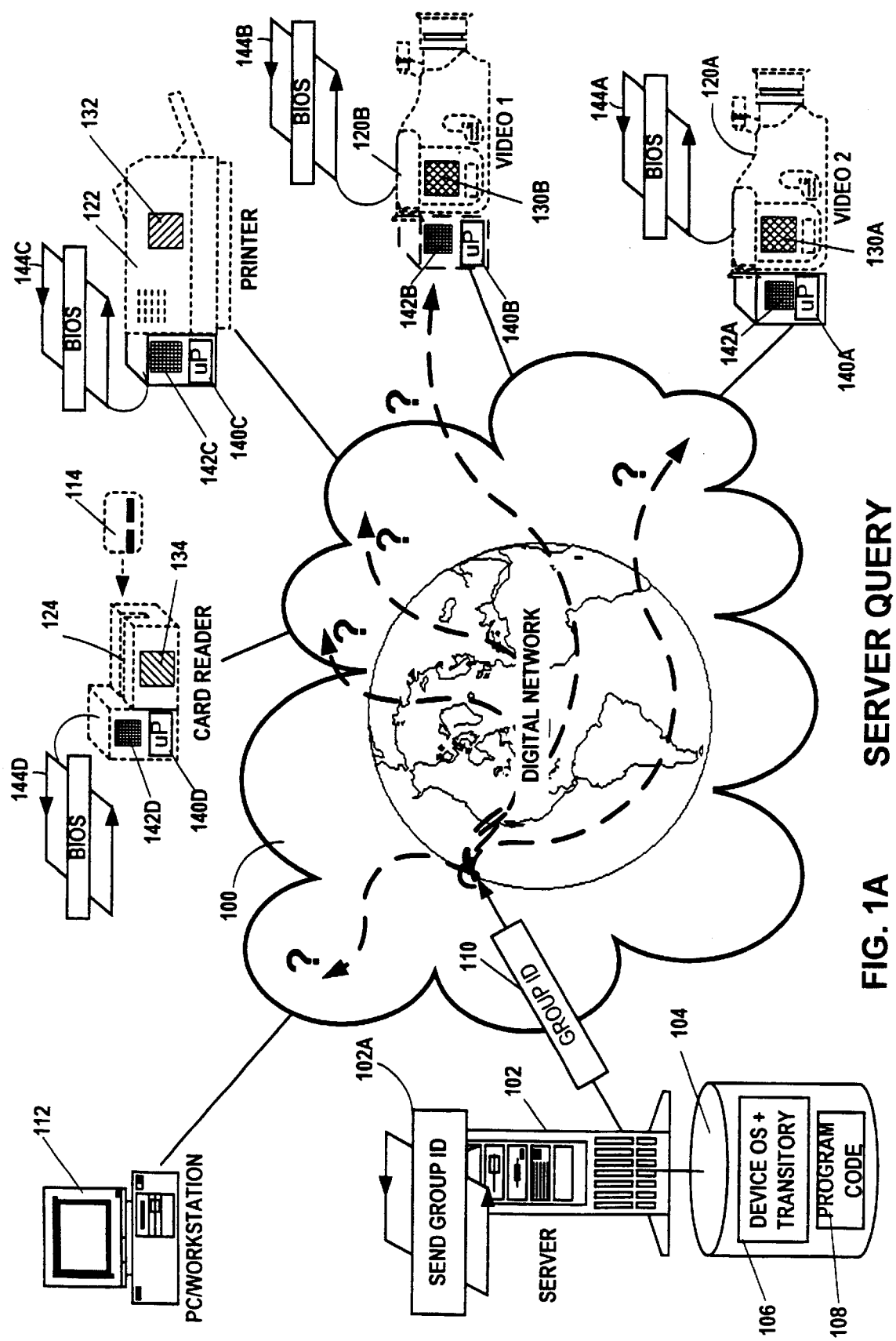
FIG. 1A   SERVER QUERY

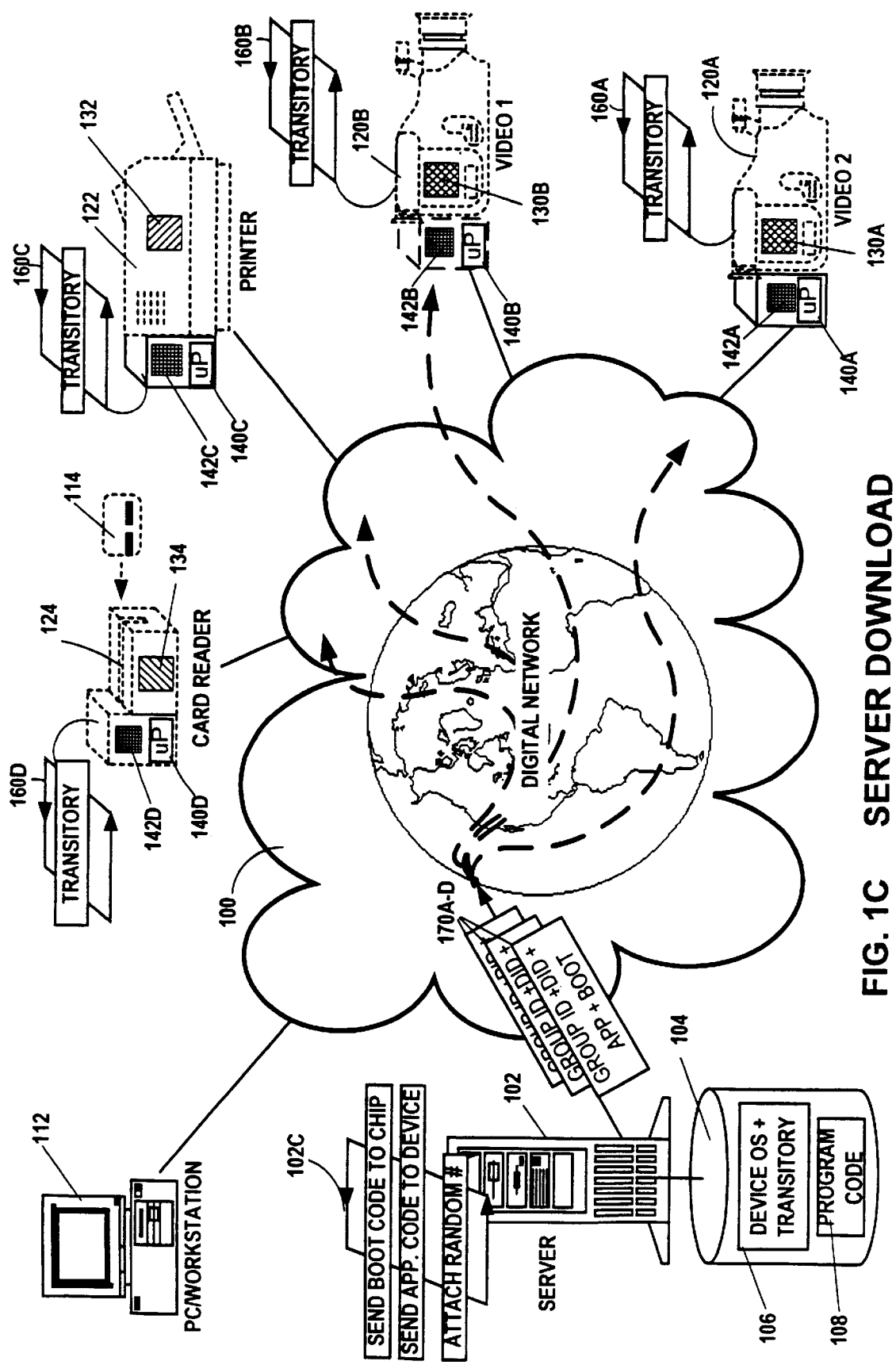
FIG. 1C  SERVER DOWNLOAD

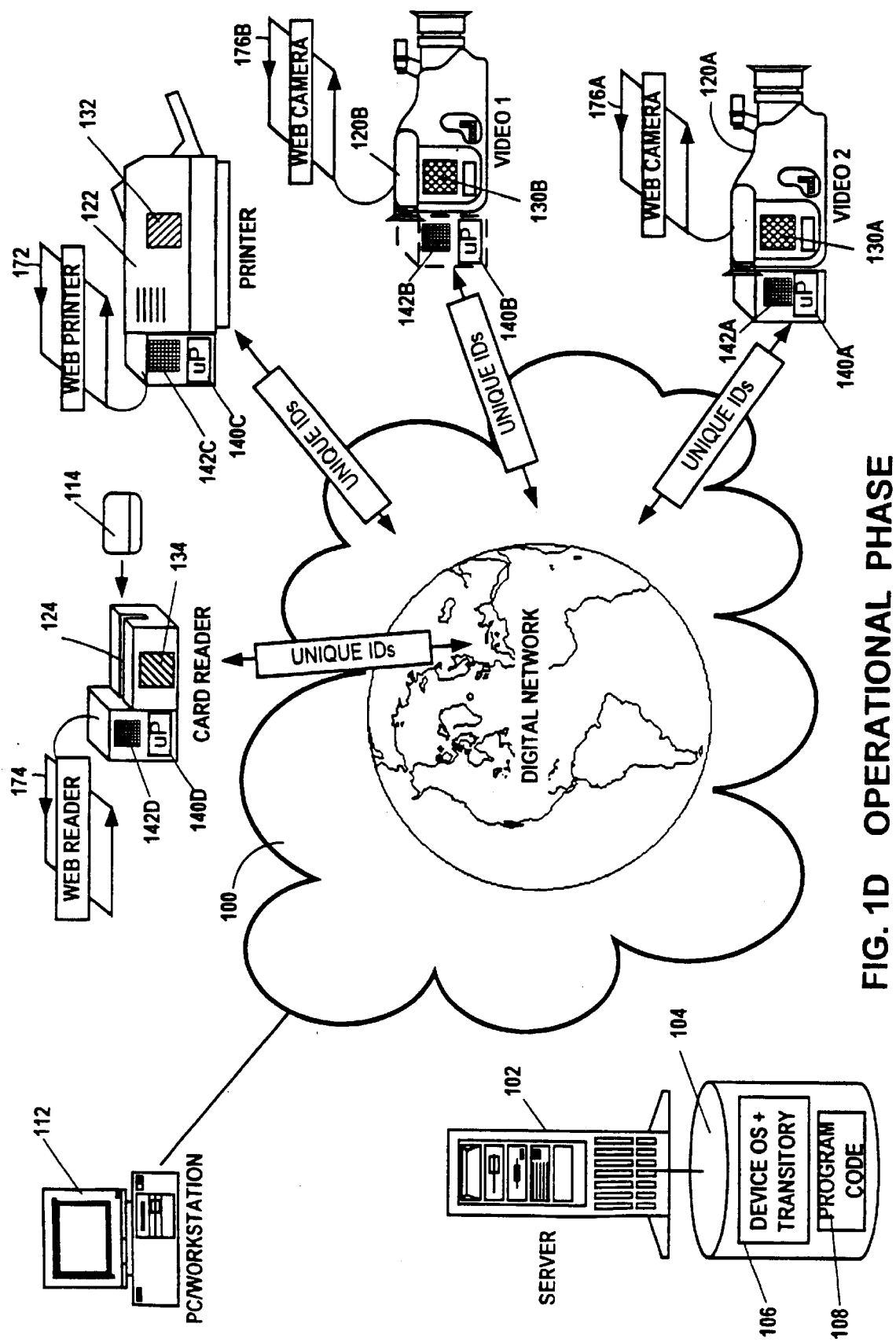
FIG. 1D OPERATIONAL PHASE

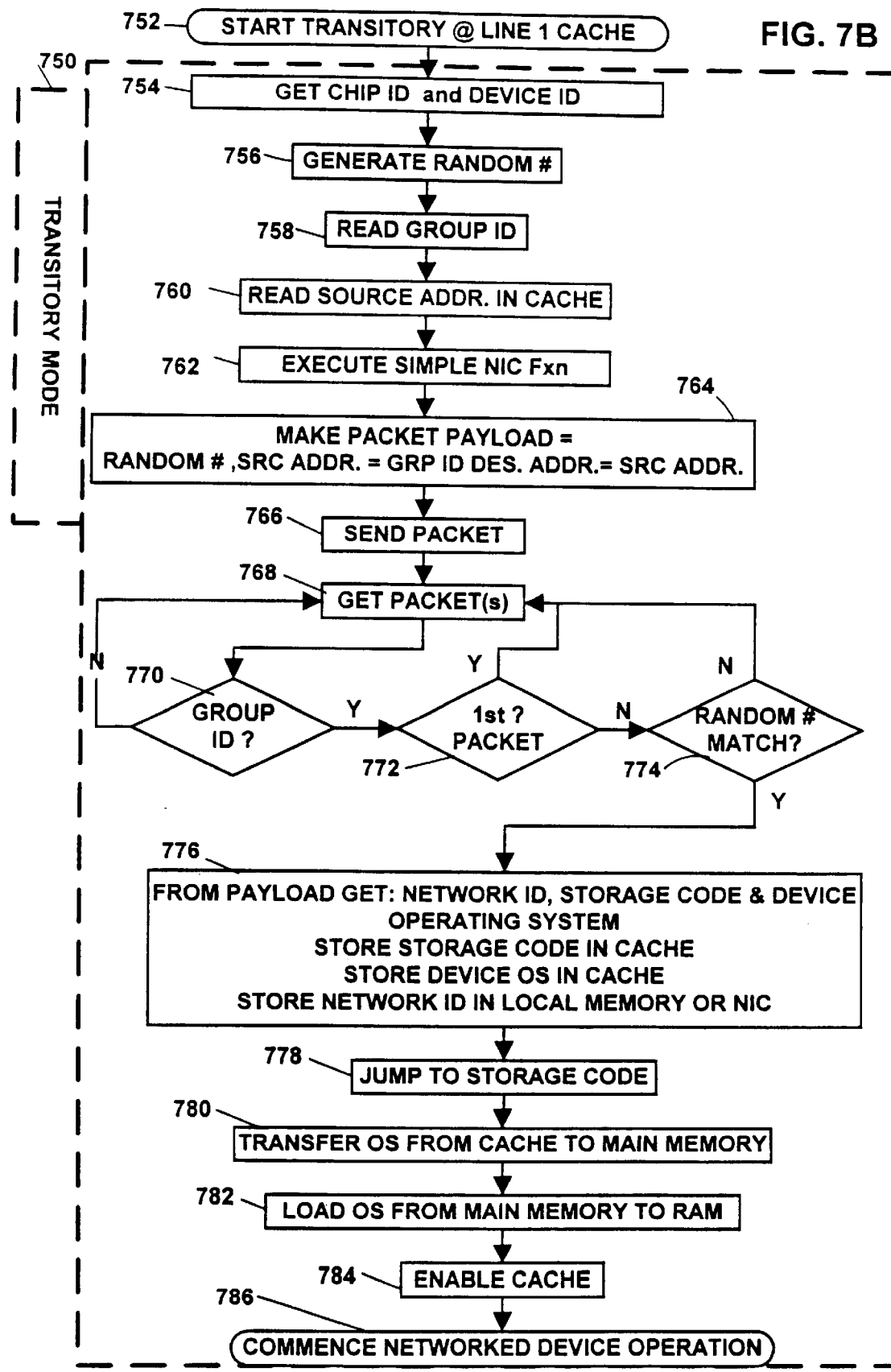

INTEGRATED CIRCUIT AND METHOD FOR BRINGING AN INTEGRATED CIRCUIT TO EXECUTE INSTRUCTIONS

PRIORITY CLAIMED

This application claims the benefit of priority to Swedish Application No. 9801671-0, filed May 13, 1998, entitled Integrated Circuit And Method For Bringing An Integrated Circuit To Execute Instructions.

BACKGROUND OF THE INVENTION

1. Field of the Invention

The present invention relates to an integrated circuit and a method for bringing an integrated circuit to execute instructions.

2. Technical Background

Control units to be used in embedded systems, e.g. network peripheral equipment for the control of different functions in a computer network, comprise a processing circuit having an integrated circuit (IC) upon which a CPU (central processing unit) and other essential units cooperating therewith, such as a cache memory, are formed. The processing circuit often also comprises a number of external units, such as external memory units, connected to and communicating with the integrated circuit via a number of ports.

Different types of processing circuit designs can be achieved by an integrated circuit of a specific design being equipped with different external units and the thus formed processing circuit being loaded with different software. Thereby one IC-design can be used for a variety of applications.

When initially loading the processing circuit with the software essential for its functions, often in connection with the manufacturing process, it is necessary to provide the integrated circuit with an external memory means, comprising one or more memory units, which memory means is loaded with a start up program and which provides memory space for receiving additional software programs for the functions of the processing circuit.

Therefore, the processing circuit is either permanently equipped with the external units needed for the initial software loading, or such external units are temporarily connected to the integrated circuit during a software loading stage of the manufacturing process.

The cost of the processing circuit is increased in an undesirable way if the circuit is to be equipped with units that are unsuitable or unnecessary for the subsequent use of the circuit.

If external units for the initial software loading are connected to the integrated circuit only during a loading stage, this stage of manufacturing will be inconveniently time consuming.

Testing of software test versions during development thereof often includes the exchanging of, erasing and reloading of memory units which renders it time consuming.

SUMMARY OF THE INVENTION

The invention has for its object to simplify the loading of necessary software into a processing circuit.

Another object is to provide an integrated circuit which can be used in a broad spectrum of applications.

A further object of the invention, is to limit the costs involved in the manufacturing process of processing circuits.

According to the invention these objects, as well as other objects that will become apparent from the description below, are achieved by an integrated circuit and a method for bringing an integrated circuit to execute instructions in accordance with the appended claims 1 and 9.

According to a first aspect of the invention, the integrated circuit comprises a switching means for switching the circuit between a working mode and an initiating mode, wherein the circuit in itself in the initiating mode, is adapted to bring a CPU on the circuit to execute instructions, received from an external signal.

In the manufacturing process, such an integrated circuit can be equipped with preferred external units for the forming of a desired processing circuit design. No requirements of specific external units for the initial software loading of the processing circuit need to be considered. Further, the software loading stage can be performed quickly, as the processing circuit can be loaded without being equipped with auxiliary equipment during the loading stage.

The manufacturing process can now be simplified, since the software loading can be performed at an optional stage, e.g. in connection with testing of a final product.

Also, an integrated circuit according to the invention is possible to reload with new and different software at any time during its future life in the same simple fashion as the initial loading.

Another advantage is the possibility of simple software testing during development of new software.

Yet another advantage of such an integrated circuit is that it in the initiating stage, instead of loading itself with additional software, can be made to perform a limited instruction, such as the switching of an external system.

In the context of the invention, an integrated circuit (IC) denotes an electronic circuit in one piece, having conductors and components integrated therewith, i.e., a chip.

According to a preferred embodiment of the invention, the IC is pre-programmed to receive the signal and to bring the CPU to execute the instructions.

This might be achieved by logical components formed on the IC by the hardware itself (hardcoded instructions). However, a memory means on the circuit preferably comprises a first memory unit for storing internal instructions to receive said signal and to execute the external instructions. The first memory unit preferably comprises a ROM having stored thereon said internal instructions. Thereby said preprogramming is achieved in a compact way and with low costs involved.

In another preferred embodiment of the invention, the memory means on the IC comprises a second memory unit for storing the external instructions to be executed by the CPU. This second memory unit and the above mentioned first memory unit might be embodied in one and the same unit. However, according to the invention it is preferred that the second memory unit comprises a cache memory unit. Since a cache memory unit preferably is provided for the CPU anyway, it should be used during the subsequent life of the circuit. Auxiliary memory units are avoided by the use of the cache memory unit. The cache memory unit preferably comprises a random access memory (RAM) and is adapted to be switched into a mode where this RAM can be used for the storing of external instructions.

According to another preferred embodiment of the invention, the IC comprises an interface control means connected to at least one of said ports, wherein the interface control means, in the initiating mode, is adapted to recognize and receive said signal. Thereby the IC can be made to listen actively for the signal on for instance a network.

According to a second aspect of the invention, it comprises a method wherein the IC is brought into an initiating mode, in which it is adapted for receiving an external initiating signal, comprising external initiating instructions. The IC then receives said external signal and uses an integrated CPU to execute said instructions. With the method according to second aspect, the same advantages are achieved as with the integrated circuit according to the first aspect.

When bringing the integrated circuit into an initiating mode, the method according to a preferred embodiment, comprises the step of adapting an interface control means on the integrated circuit to receive an external signal. Thereby the integrated circuit is preferably enabled to recognize said external signal among other signals, such as on a network connected thereto. In a preferred way this can be achieved by giving the integrated circuit a predetermined initiating address, which is temporary and unique for the initiating mode, and which is to be recognized by the interface means for the receiving of the external signal.

Thereafter the method according to a preferred embodiment comprises the step of sending the external signal to the integrated circuit, whereby the signal preferably is addressed to the predetermined initiating address and preferably has a predetermined size.

According to another preferred embodiment of the method, the external instructions, when received and prior to being executed, are stored in a memory means forming part of the integrated circuit, preferably a cache memory unit. Thereby the step of bringing the IC in an initiating mode preferably comprises the step of adapting the cache memory unit to work as a RAM for storing the external instructions.

According to another aspect of the invention, a first small startup program is permanently stored on the IC and, in an initiating mode, is activated to make the IC receive a second, somewhat larger start-up, program, which in turn initiates the actual loading of the IC and external units connected thereto.

BRIEF DESCRIPTION OF THE DRAWINGS

FIGS. 1A–D show the overall network environment for configuring network attached peripherals from a central server.

FIGS. 7A–B are process flow diagrams of the configuration processes performed by the peripheral.

DETAILED DESCRIPTION

Figure 1B:
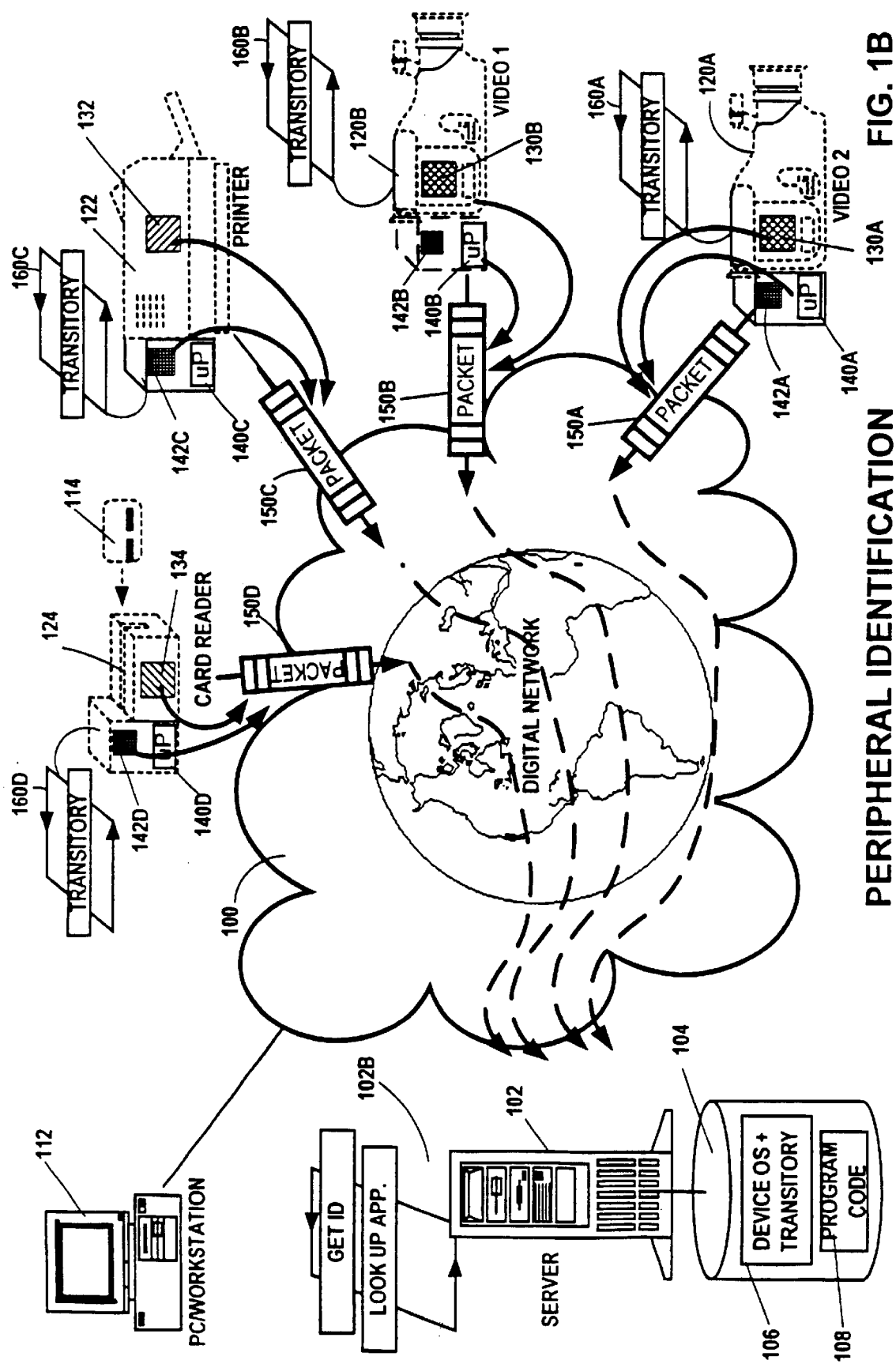

FIGS. 1A–D show the various phases of interaction between a configuration server and a plurality of network attached peripheral devices which need to be configured. In the embodiment shown, the network attached peripherals are not fabricated with either a unique network address or basic operational capability. At the time they are attached to the network they are un-configured in both a network and operational sense. This greatly reduces manufacturing costs and allows components such as the processor for each of the peripheral devices to be made from a single chip, provided of course, that the devices can be configured across a network with a unique network address and device specific operational capability.

FIG. 1A shows a server 102, a work station 112, a plurality of peripheral devices 120A–B, 122 and 124 connected to one another over a network 100. The server 102 is connected to a storage 104. The storage 104 includes a plurality of applications, operating systems, transitory code, and storage code in file 106 and program code 108 for configuring the server to perform as a configuration server. Each of the peripheral devices 120A–B, 122 and 124 in an embodiment of the invention includes two identifiers (IDs), one for the device itself and the other for a configurable multi-mode chip which is part of the device. The IDs are not unique to each device but instead identify the type of device e.g., printer/camera, as well as the model number. There may be many peripherals with the same ID. The peripheral device ID for devices 120A–B are respectively IDs 130A–B. The peripheral ID for the printer 122 is printer ID 132. The ID for the card reader 124 is card reader ID 134. Each of the peripheral devices is shown in phantom view in FIG. 1A because at this point they all lack the ability to perform as either a printer, a card reader, or a camera. They all lack processing capability or operating system code (OS) necessary to perform as either a printer, card reader or camera.

Each of the peripheral devices includes an attached multi-mode chip with an ID. The chip ID as with the device ID is not unique, but instead identifies the chip type and/or model number. There may be many chip's having the same ID. Multi-mode chip 140A and associated ID 142A are part of peripheral device 120A. Multi-mode chip 140B and its ID 142B are part of peripheral device 120B. Multi-mode chip 140C and its ID 142C are part of peripheral device 122. Multi-mode chip 140D and its associated ID 142D are part of peripheral device 124.

In operation the server 102 initiates processes 102A as a result of program code 108 contained in storage 104. These processes assemble and send a packet 110 having a group ID (see FIG. 3) across the network 100. Each of the multi-mode chips 140A–D implements kernel BIOS 144A–D processes (See FIG. 1A) for prospectively peripheral devices 120A–B, 122 and 124. These minimal boot code processes which are part of the initial configuration of the chips 140A–D cause those chips to accept the packet having a group ID corresponding to their own group ID from the network 100. Thus, each of the multi-mode chips would receive and accept for processing a packet with a single group ID. Alternately there could be one group ID for chips connected to printers, another for chips connected to cameras, etc. Even in this embodiment the multi-mode chip in one camera would have the same group ID as another. In an alternate embodiment of the invention the initial packet 110 could be broadcast across the network with an address indicating that all peripheral devices to accept the packet.

The next phase of operation is shown FIG. 1B. In FIG. 1B, each of the multi-mode chips 140A–D has received the initial packet 110 with a group ID in its destination address. In this packet transitory code sent by the server in the initial packet causes the multi-mode chips 140A–D to initiate transitory processes 160A–D. The chips retrieve their identification and the identification of the peripheral device to which they are attached. In response the multi-mode chips send responsive packets 150A–D to the server 102. In an embodiment of the invention, these packets may contain a source address which is a group address and payload which contains a unique identifier generated by each of the chips 140A–D to enable the server to distinguish one packet from the other. This identifier is not a unique destination address as is required in prior peripheral devices. Instead rather than configuring each of the multi-mode chips 140A–D in the factory with the unique network ID network, the unique network ID will be assigned in subsequent processes. In an embodiment of the invention, each of the chips generates a random number and puts that in the payload portion of the responsive packet sent to the server. In addition the responsive packet sent by each of the multi-mode chips may contain the chip ID and the device ID.

By manufacturing the multi-mode chip and the peripheral devices without either the application code, or operating system or even a unique network ID a number of benefits are realized. First, network IDs can be assigned dynamically in processes which will be disclosed subsequently. Secondly, up-to-date versions of OS and/or application code can be downloaded to the devices at time of actual configuration on the network. Third, the expense of peripheral devices can be reduced by implementing them with a chip capable with both network interaction, as well as the capability to perform as the basic processing unit for the device. When the server 102 receives the packet(s) 150A–D from each of the multi-mode chips 140A–D it begins a lookup process 102B in file 106.

In FIG. 1C the next phase is the download phase of operation is shown. After the server has received the packets from one or more of the peripheral devices as discussed above in FIG. 1B the server implements processes 102C. Processes 102C utilize the chip and device identifiers in the incoming packets to find in file 106 the appropriate OS or application code for the multi-mode chip and application code for the peripheral device in which each multi-mode chip is embedded. The server then using the same group ID as a destination address, sends packets 170A–D. In an alternate embodiment of the invention the server could include as a destination address a broadcast address.

In either embodiment the payload of each of the packets contains: the random number sequence received in the incoming packet and the boot and application code for the corresponding device. In an embodiment of the invention each of the packets may also contain the corresponding chip and device identifiers.

Each of the multi-mode chips 140A–D on each of the peripheral devices picks up every group packet but only utilizes the OS and/or application code from the packet containing a random number matching the random number generated by the specific multi-mode chip. In this manner, each of the peripheral devices processes only its own unique packet even though they lack at this stage a unique network address. Additionally, the payload of each unique packet from the server contains a unique network address assigned by the server for subsequent use by the peripheral device.

FIG. 1D shows the final operational phase. At this point in time each multi-mode chip has a unique network address. The multi-mode chip has additionally begun to function its role as an integral processing unit for the components of each of the peripheral devices. The card reader 124, implementing processes 174, can now read cards 114. The printer 122, implementing processes 172, can receive print jobs over the network 100. The cameras 120A–B, implementing processes 176A–B, can photograph images and send those over the network. This latter function is accomplished by the device specific OS and/or application code downloaded in FIG. 1C from the server 102.

Figure 2:
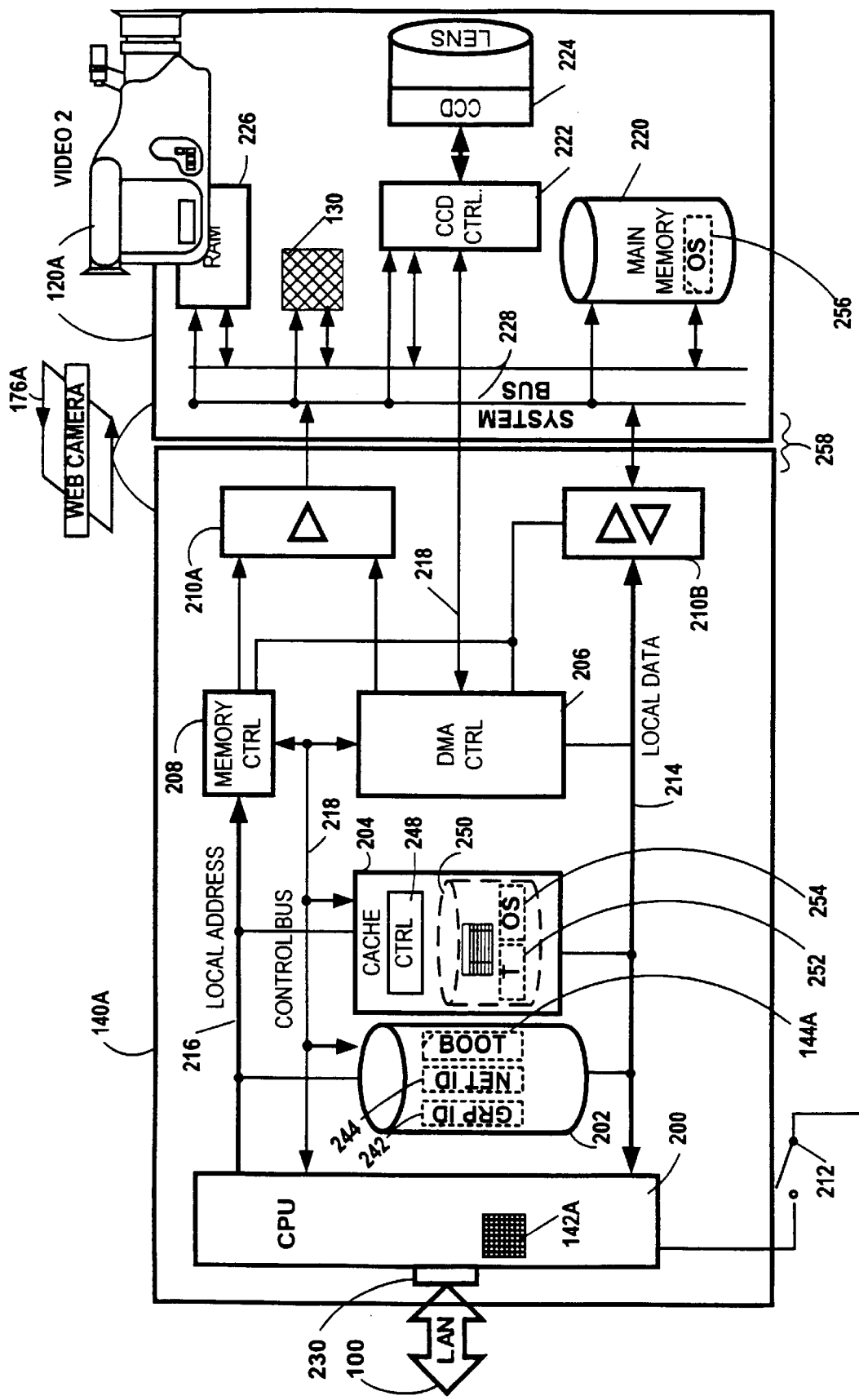
FIG. 2 is a hardware block diagram of a dual mode chip and integrated peripheral device according to an embodiment of the invention.

FIG. 2 is a hardware block diagram of the multi-mode chip 140A and a peripheral device 120A (see FIGS. 1A–D). The multi-mode chip 140A includes a central processing unit (CPU) 200, a local memory 202, a cache 204, a direct memory access (DMA) controller 206, a memory controller 208, address and data buffers 210A–B and an optional switch 212. The cache includes a cache controller 248 and a cache memory 250. The peripheral device, in this case web-camera 120A, includes a main memory 220, a charge couple device (CCD) controller 222, a CCD and lens assembly 224, a device ID 130, a volatile memory 226 and an external port 230 for connecting the chip to the network.

The multi-mode chip 140A includes local data and address buses respectively 214–216 and a control bus 218. The local data bus 214 couples the CPU 200 to the local memory 202, the cache 204, the DMA controller 206 and the data buffer 210B. The local address bus 216 couples the CPU to the local memory, the cache, and the memory controller 208. The control bus couples the CPU and the local memory 202, the cache 204 and the DMA controller 206. Both the DMA controller and the memory controller are coupled to the address buffer 210A. The optional switch 212 provides a switchable input to the CPU 200. The external port 230 couples the CPU to LAN 100 (See FIG. 1). In this embodiment of the invention the network interface functions are performed by chip 140A either by CPU 200 or by a separate on chip Medium Access Controller (MAC) and packet processor. In an alternate embodiment of the invention the external port 230 couples the chip to a LAN via an external network interface (Not shown). The peripheral device and the chip couple to one another through an interface port 258 containing address, data and control signal lines.

Within the peripheral device a system bus 228 links the main memory 220, the peripheral device ID 130, the volatile memory 226 and the CCD controller 222. The CCD controller is coupled to the combined CCD and lens assembly 224. Between the multi-mode chip and the peripheral device, address and data connections from respectively, address and data buffers 210A–B couple the two devices. An additional coupling is provided by control bus 218 which links the CCD controller 222 to the DMA controller 206. Within the multi-mode chip 140A a multi-mode chip identifier 142A is present. The chip ID in an embodiment of the invention is fabricated as a read only register which is part of the CPU 200 of the chip. In an other embodiment the chip ID may be stored in local memory 202 The chip identifier, as well as the device identifier 130 is utilized to identify the make and/or model number of the multi-mode chip and the device to the server 102. The identifier need not in other words be unique to the device, rather to a group of devices having a common make and/or model number.

There are three phases to the initialization of the multi-mode chip and peripheral device. These phases correspond to the packets 110, 150A–D and 170A–D shown in respectively FIGS. 1A–D. The current invention provides for a combined device which can be configured remotely over a network from a starting configuration devoid of either a unique network address or an operating system. In the first phase of operation, the local memory contains only a group identifier 242 and kernel BIOS 144A. The kernel BIOS 144A is capable of configuring the local bus, of determining whether it is in an initialization or normal mode and of responding to a packet 110 from the server 102 having as a destination address a group identifier rather than a unique network ID (see FIG. 1A).

An additional feature of the kernel BIOS is that it is capable of disabling the cache controller 248 to allow the transitory use of cache as a normal volatile memory. In the normal mode, the cache subsystem of the chip will have the functionality of checking hit/miss, dirty bits, etc. In the BIOS and transitory phases of operation the cache memory acts as a "normal" random access memory (RAM) by disabling the hit/miss check etc. The RAM of the cache is instead mapped in at a fixed address. In the BIOS phase of operation shown in FIG. 1A, the server 102 sends out a packet 110 having as a destination address a generic group identifier. This packet will be processed by any and all of the multi-mode chips 140A–D shown in FIG. 1A. Provided only that each of those chips has in local memory 202 a group identifier 242 which corresponds to the group identifier in the packet. When the packet is received its payload portion is extracted and the transitory code 252 is loaded. The transitory code provides random number generation, identification, packet transmission and packet receipt capabilities.

Next the second or transitory phase of operations in the multi-mode chip commences. This phase of operation is shown in FIGS. 1B–C. In the transitory phase, the transitory code 252 is executed. This code provides several functionalities. First, it provides for the multi-mode chip to send a responsive packet to the server with a payload which includes a random number generated by the CPU 200 at time of execution, as well as the chip and device model IDs 142A, 130. In an embodiment of the invention this random number may for example correspond to the time from power on reset. The number should have enough bits to make the risk for two peripheral devices generating the same number negligible. Even if several units or peripheral devices are turned on at the same time they will generate different numbers since no more than one unit can send a packet on the network at the same time. By putting this number in the packet and storing the number temporarily in cache memory 250, the multi-mode chip is capable of identifying a return packet from the server containing the random number in its payload by simply comparing the two.

The third or operational phase of chip operation is shown in FIG. 1D. In that phase the storage and OS/application code 254 from the server is downloaded to the multi-mode chip and stored in cache memory 250. Utilizing the storage code the operational processes transfer the operating system to main memory. With the device thus configured the multi-mode chip serves as the central processing unit for the web camera executing processes 176A (see FIG. 1D). The cache reverts to its normal function of keeping copies of recently used sections of main memory 220 for access by the CPU 200.

FIGS. 3 and 4A–C show an embodiment of the packet protocols on the local area network (LAN) 100 (See FIGS. 1A–D). Information transferred across networks does so with wrapping protocols for the information being transferred. Each packet contains a plurality of headers and payload. The headers contain information specific to one of the corresponding seven layers of the OSI model. Headers and payload on a LAN are referred to as a packet. Headers and payload on an integrated services digital network (ISDN) are referred to as frames. Until recently network traffic on either a LAN or ISDN network comprised packets/frames with up to seven headers, and a payload. The headers contained information specific to each of the seven layers of the OSI model. The payload contains the audio, video, or data being transferred. On the LAN the structure of headers and payload is specified by the respective IEEE LAN standard such as 802.3, 802.5, etc. These standards are hereinafter referred to as 802.x. On the ISDN side the structure of the headers and payload is specified by the point-to-point protocol (PPP) or the High-Level Data Link Control (HDLC) protocols promulgated by the International Standards Organization (ISO).

Figure 3:
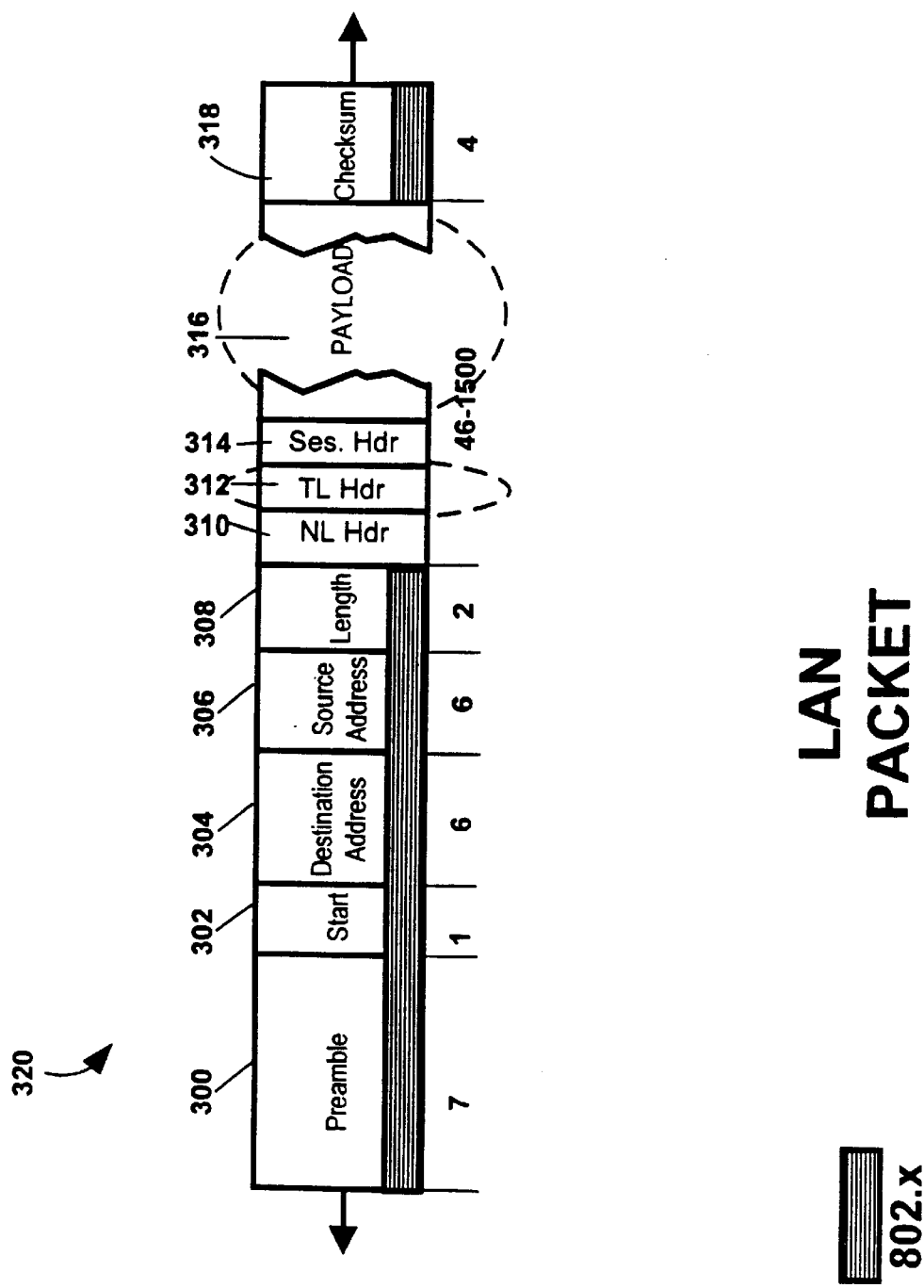
FIG. 3 shows a IEEE 802.3 packet.

FIG. 3 shows a detailed view of one of the possible packet types 320 which can be transmitted over LAN 100 (see FIGS. 1A–D). The details of the wrappers for packet 320 are shown. Specifically, the protocol for this packet conforms with the IEEE 802.3 specification. The 802.3 packet begins with a preamble 300. The preamble is seven bytes in length with each byte containing the bit pattern 10101010. The preamble allows the receiver's clock to synchronize with the sender. Next comes the start of frame flag 302 containing the binary sequence 10101011. Next is the destination address field 304 which is six bytes in length followed by a source address field 306 which is also six bytes in length. The source address field 306 identifies the party sending the packet while the destination address field 304 identifies the party to whom the packet is being sent. The length field 308 follows. The length field which is two bytes in length indicates how many bytes are present in the data/payload field from a minimum of zero to a maximum of 1500 bytes. Headers 310–314 contain respectively the network layer, transport layer, and session layer headers for the payload field 316. The payload may contain various types of information including: modem session setup commands, session parameters, or data. Data may be audio, video, or textual. Immediately following the payload is checksum field 318.

Figure 4A:
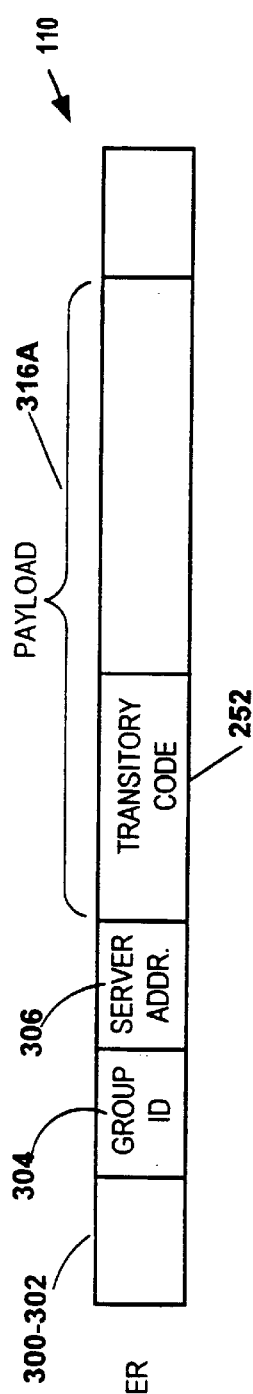
FIGS. 4A–C show packets sent between the server and the peripheral devices at various phases of the configuring processes.
Figure 4B:
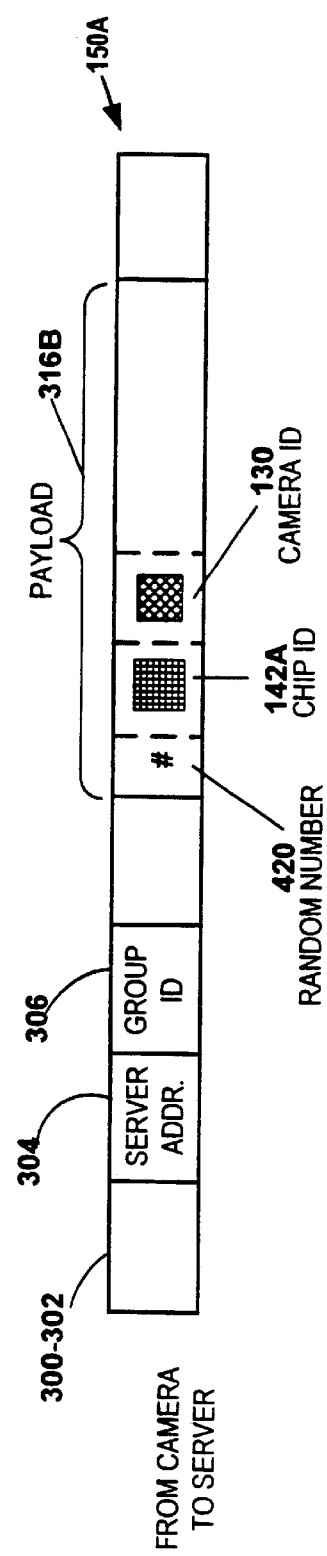

FIGS. 4A–B show respectively the packets 110, 150A, 170A sent between the server and the peripheral devices as discussed above in FIGS. 1A–D.

FIG. 4A shows the packet 110 initially sent from the server to all of the peripheral devices having a group identifier corresponding to the group ID in the packets destination address field (see FIG. 1A). This packet includes for its destination address field 304 a group identifier which is the same identifier for each of the multi-mode chips 140A–D (see reference 242 in FIG. 2). The source address field 306 portion of the packet contains the network address of server 102. The payload field 316A includes transitory code 252 (see FIG. 2). This code enables the receiving multi-mode chip with the ability to obtain both its peripheral device identifier and chip identifier. Additionally, the code enables the chip to generate a random number and to send a responsive packet to the server. Furthermore, the code enables the chip to receive and process a return packet after which the code is erased or overwritten by normal cache operations.

FIG. 4B shows the packet 150A sent from any of the peripheral devices in response to the server's initial packet 110. Utilizing the transitory code the multi-mode chip has placed in the payload field 316B of the packet: a random number 420, the chip model identifier 142A as well as the camera identifier 130 (see FIG. 2). The destination address field 304 is the address of the server 102. The multi-mode chip obtained that address from the source address field 306 of the initial incoming packet 110 from network 100 (see FIG. 4A).

Figure 4C:
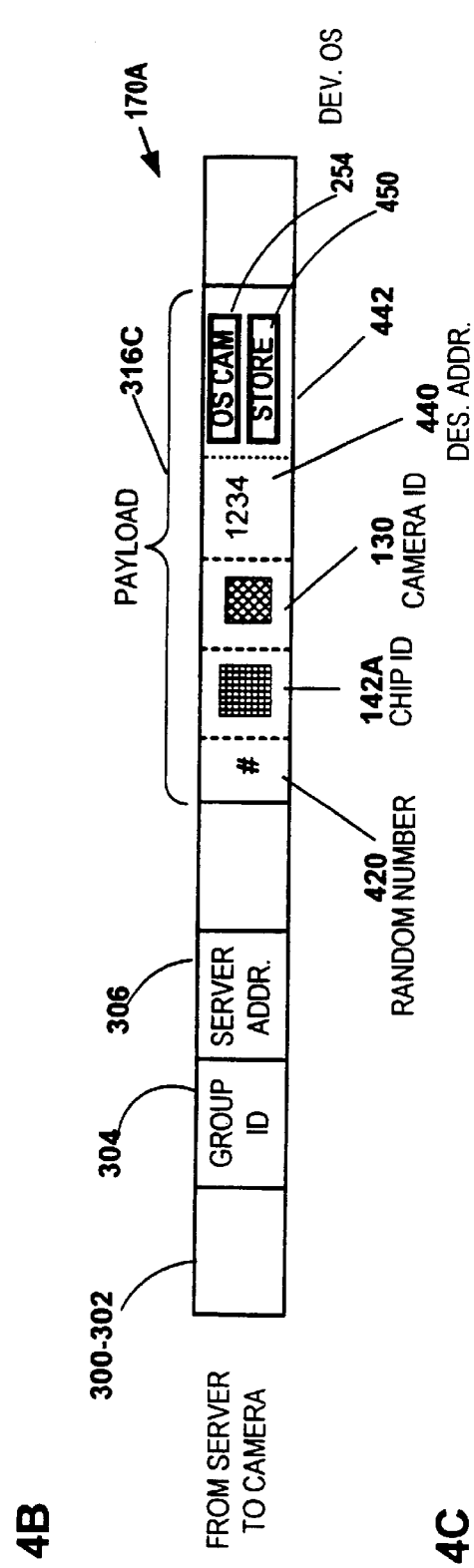

FIG. 4C shows the second packet 170A sent by server 102 to the peripheral devices (see FIG. 1C). This packet has as a destination address the group identifier. This packet will be received and processed by all of the multi-mode chips. The source address of the packet is the address of server 102. In the payload field 316C the server has packaged the random number 420 initially generated by the multi-mode chip and received by the server in packet 150A. This number is unique for each chip for reasons discussed above in FIG. 2 and will be used by the chip to discriminate between packets 170A–D the one packet which contains the same random number. In an embodiment of the invention the chip model ID 142A and the camera ID 130 may also be included in the payload from the server to the chip. The next portion of the payload field 316C contains a unique network address 440 assigned by the server for the specific peripheral device which generated the random number. Peripheral addresses are global and centrally administered by the server to assure that each address is unique. This unique network address will be used by the peripheral device and multi-mode chip in subsequent network communications. Thus, in all further communications with the network, packets sent to the peripheral device will not be sent on a group basis but will instead be sent on a targeted basis because the destination address field 304 of the LAN packet will contain a unique network address. The next portion of 442 of the payload field 316C contains two code segments 254 and 450. The first of these code segments is the operating system and/or application for this specific peripheral device being network configured. The second of these code segments the "storage" code 450 contains the code required to write to main memory 220 and to volatile memory 226 (see FIG. 2) the OS 254 and its image.

Figure 5:
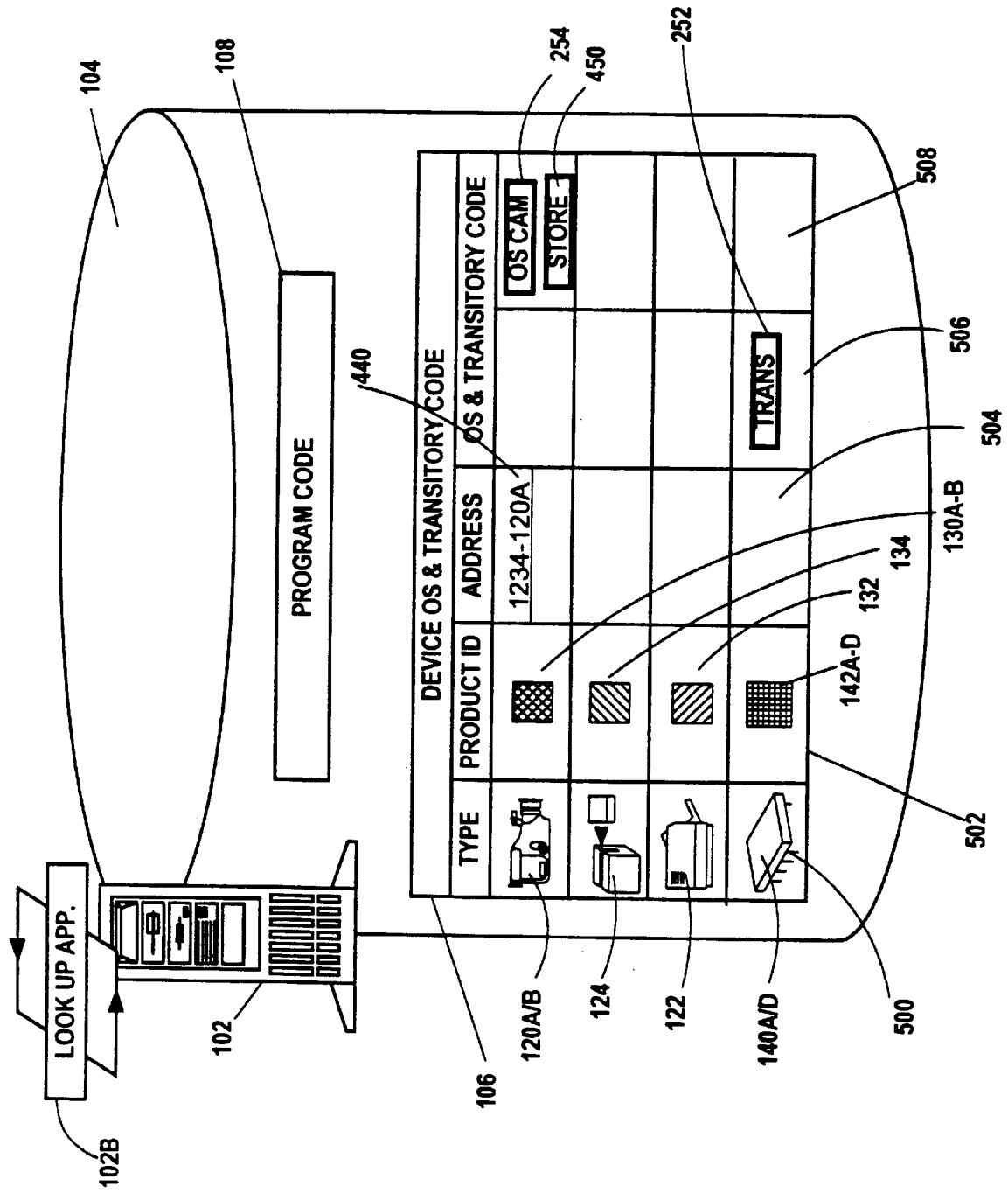
FIG. 5 shows the data structures on the server.

FIG. 5 shows a data structure in the storage 104 of server 102 (see FIGS. 1A–D). A program code 108 and the device operating system in transitory code files 106 are shown. In greater detail, the device operating system in transitory code data base includes a plurality of records for each of the peripheral devices 120A–B, 122, 124, as well as all of the multi-mode chips 140A–D. There may be records for each model and version number as well. Each record includes a type identifier field 500, a product ID field 502, an address field 504, a transitory code field 506 and an operating system code field 508. In the example shown for the record the web cameras 120A–B includes the product ID 130A–B within product ID field 502 and contains both the operating system for the camera 254 as well as the storage code 450 to allow the CPU 200 to program main memory 220 (see FIG. 2). The record for the multi-mode chips 140A–D includes in the transitory code field 506 a transitory code 252 (see FIG. 2). As the server downloads code to each peripheral device it assigns the device a unique network ID which is initially sent to the device in the payload of a packet having a group address as the destination address. That address will be used by the peripheral device and associated multi-mode chip in subsequent network communications. Anticipating this fact, the server records the address it has assigned to the device in the network name space and in the file 106. The entry "1234" in the address field 440 for the record for the peripheral device 120A is shown in the destination address field 440 of that record. Their would be a separate record for peripheral device 120B and a separate network address.

Figure 6:
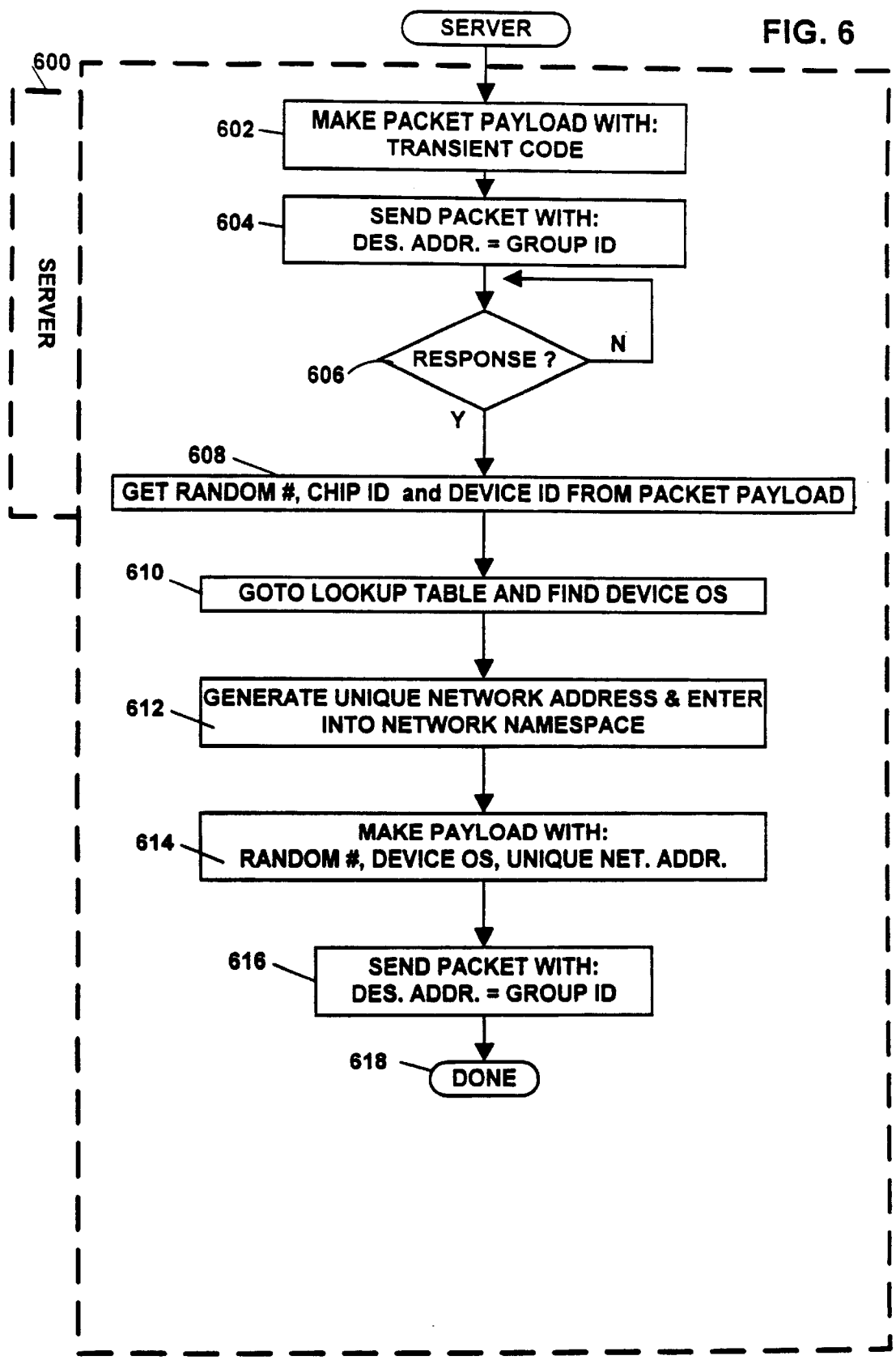
FIG. 6 is a process flow diagram of the peripheral configuration processes performed by the server.

FIG. 6 shows the processes 102A associated with the performance of the server 102 as discussed above in FIGS. 1A–D. Server processing 600 begins with process 602 in which transient code 252 (see FIGS. 2, 4) is obtained from the file 106 in storage 104 (see FIGS. 1A–D). Control is then passed to process 604. In process 604 the packet 110 is assembled by the server with a destination address corresponding to the group ID for the peripheral devices (see FIG. 4A, 1A). Control is then passed to decision process 606. In decision process 606 the server responds to any one of packets 150A–D from one or more of the multi-mode chips 140A–B (see FIGS. 1B). Control is then passed to process 608. In process 608 the server extracts from the payload field 316B (see FIG. 4B) the random number generated by the multi-mode chip as well as the chip and device IDs, respectively 142A, 130. Control is then passed to process 610.

In process 610 the server goes to the look-up table in file 106 to find the corresponding records for the chip ID and peripheral device ID obtained in the incoming packet in process 608 discussed above. Using these IDs the records with corresponding chip and peripheral device IDs are located in the look-up table in file 106. From the record with the corresponding chip ID, e.g. the transitory code, e.g. 252 (see FIG. 5) is obtained. From the record with the corresponding peripheral device ID, e.g. 120A/B, the OS and/or application code and storage code are obtained, e.g. 254, 450. The storage code is used for loading the OS and/or application code for the peripheral device into main memory. Control is then passed to process 612.

In process 612 the server generates a unique network address for the peripheral device and includes that address in the payload portion of the packet 170. That address will be used by the peripheral device and associated multi-mode chip in subsequent network communications. Anticipating this fact, the server records the unique network address it has assigned to the device in the network name space and in the file 106. For example, the unique network address "1234" is shown in the network address field 440 which is part of the record for the peripheral device 120A.

The device and chip IDs, as discussed above, only distinguished one type of peripheral device from another or possibly one model number of peripheral device from others of the same type. The device and chip IDs do not, however, distinguish peripheral devices having the same model number one from another. This distinction is accomplished by the unique network address assigned by the server. The server virtue of the passing of a random number stamp in the packets to and from the server. The server keeps track of the random number received in incoming packets from each peripheral device and assigns a corresponding network address to the device. Control is then passed to process 614.

In process 614 a payload similar to that described and discussed above in FIG. 4C is assembled by the server. That payload contains a generic group ID which means it will be received by all peripheral devices and contains in its payload the random number 420 which was received by the server from the corresponding peripheral device. The payload also contains OS and storage code to configure the device. The payload also contains the random number originally generated by the device. This random number is used by the peripheral device to distinguish its packet from those others containing the same group address.

Control then passes to process 616 in which the server sends the packet across the network 100 (see FIG. 1C) to the peripheral device. Control is then passed to process 618 which the server has completed its operation for configuring, detecting and configuring peripheral devices. As will be obvious to those skilled in the art, the server may subsequently serve as a repository or a database for the peripheral devices.

Figure 7A:
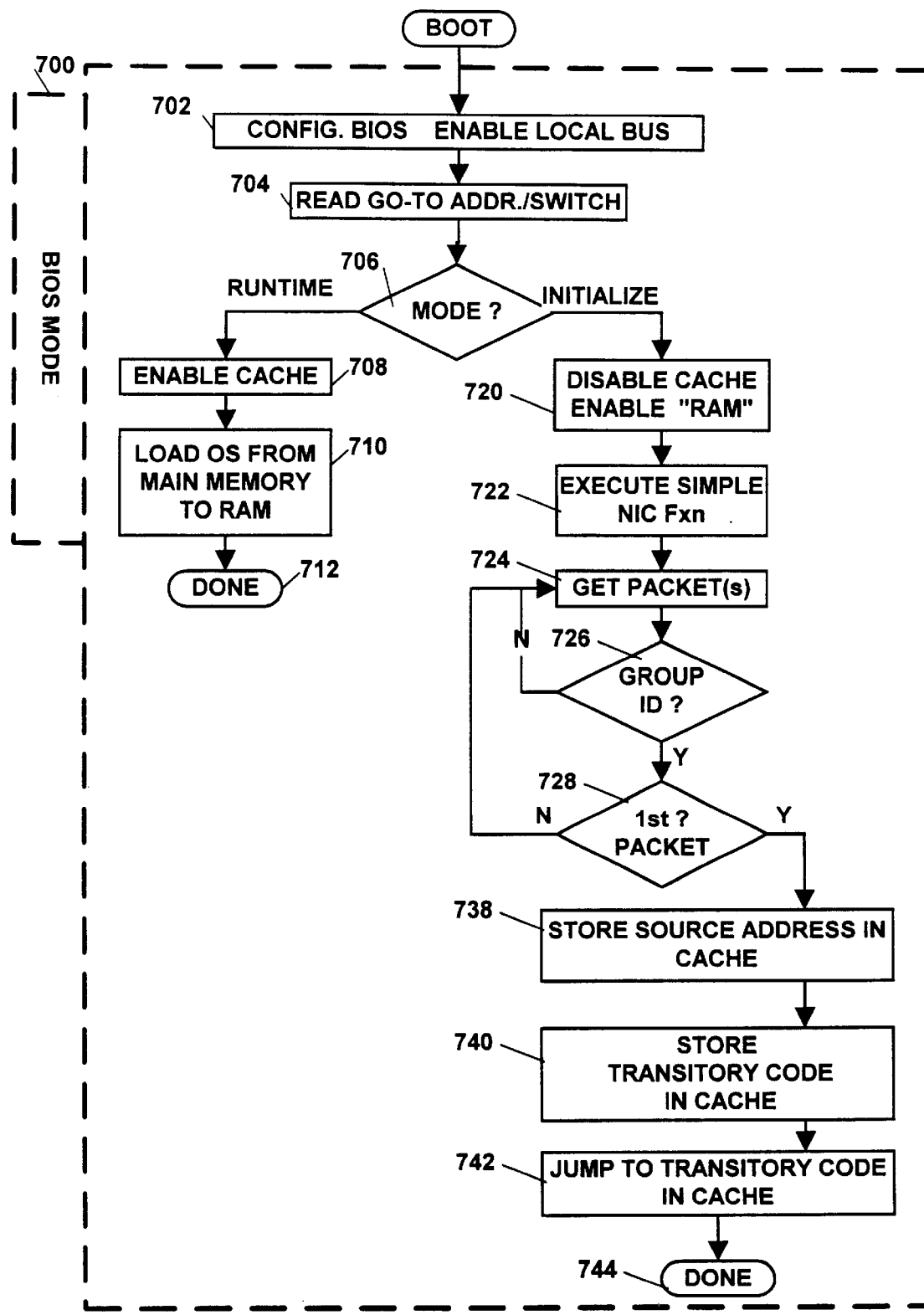

FIG. 7A–B show an embodiment of the processes on a multi-mode chip and attached peripheral device for obtaining a unique network ID and an appropriate operating system. Processing for the bios subroutine 700 begins with process 702 which occurs after power on. In process 702 the kernel BIOS 144A begins execution (see FIG. 2). The local bus and associated components, i.e. local memory 202, cache 204, DMA controller 206, and memory controller 208 are enabled (see FIG. 2). Control then passes to process 704. In process 704 the BIOS tries to determine the mode of the multi-mode chip. In an embodiment of the invention, the BIOS looks to a specific address or pin to determine its status. In an embodiment of the invention the pin is connected to optional switch 212 (see FIG. 2) which can be utilized to manually place the multi-mode chip 140A in either normal run-time mode or the initialize mode. In an alternate embodiment of the invention, the address would be an address in local memory that would contain one bit sequence for initialization mode and another for runtime mode. For example, if a unique network ID 244 (see FIG. 2) was not present in local memory then the BIOS is in initialize mode. Control is then passed to decision process 706.

In decision process 706 a determination is reached as to what mode the chip is in. There are numerous methods by which this decision can be reached. Optional switch 212 could be manually set. Alternately, a fixed address in memory could be read by CPU 200 to determine its value. In an alternate embodiment of the invention, each multi-mode chip and peripheral device would first operate in an initiating mode. A non-volatile programmable means (e.g. PROM, FPGA, fuse, etc.) on the chip would apply the switching signal at optional switch 212 (see FIG. 2) if it is in its initial state (e.g. fuse not blown). After the chip is initialized, and the OS code is loaded into main memory 220 (see FIG. 2) the programmable device controlling the switch signal is altered, thereby causing the CPU to start up from main memory 220 the next time.

In the event the determination is reached that the multi-mode chip is in the run-time mode, i.e. that control is passed to process 708. In process 708 the cache 204 is enabled to function as a cache with either for example any number of cache policies including "write-through" or "copy-back" for example. Control is then passed to process 710 in which the operating system 256 stored on main memory 220 of the peripheral device (see FIG. 2) is loaded from main memory into RAM 226 to begin operation of the peripheral device as a web camera. In this mode control is then passed to process 712 in which the BIOS completes its operation. In an alternate embodiment of the invention the OS is executed directly from main memory without loading into RAM.

In an embodiment of the invention, the CPU 200 serves as the processor for not only the network interface including medium access control (MAC) functions but also packet assembler and disassembler (PAD). In an alternate embodiment of the invention, the CPU 200 serves as the processor for the peripheral device, e.g. the web camera 120A. The CPU 200 would then implement various image processing algorithms. In an alternate embodiment of the invention, the CPU 200 serves both as a network interface processor including MAC and PAD functions and also as the processor for the peripheral device.

If alternately in decision process 706 a decision is reached that the chip is in the initialize mode then control is passed to process 720. In process 720 the cache controller 248 (see FIG. 2) is disabled and the cache therefore performs as normal volatile memory. Control is then passed to process 722. In process 722 the CPU 200 either on its own or in conjunction with a dedicated MAC chip and PAD chip executes simple network interface functions to be described in the following processes 724–742. Control is then passed to process 724. In process 724 the CPU 200 intercepts packets from LAN 100. The control is then passed to decision process 726. In process 726 the CPU 200 looks at the destination address field 304 (see FIG. 4A) to determine the destination address. If the destination address is a group ID corresponding to the group ID 242 stored in local memory 202 (see FIG. 2) then control is passed to decision process 728. If the destination address does not correspond to the group ID for this multi-mode chip, then control returns to process 724 for the fetching of the next packet.

When control is passed to a decision process 728, a determination is made as to whether the packet received with a group ID in the destination address field 304 is the first packet type, e.g. packet 110, sent by the server or the second packet type, e.g. 170. In an embodiment of the invention, this determination would be based on a sequence number for example, 0 or 1, placed in the packets 110, 170 (see FIG. 1A and FIG. 1C) by the server. There are a number of different ways in which the server packets with transitory code can be distinguished from the packets containing random numbers, network addresses and OS and storage code. First if the IP protocol is being implemented, there will at a transport layer be a sequence number contained in the transport layer header 312 of the LAN packet (see FIG. 3). Alternately, a sequence number could be placed in the payload by the server. Alternately, the CPU 200 could look at the payload to see if there's anything resembling a transitory code as opposed to random number, network address and OS in the payload. If a determination is made that the packet received is not the first packet type, then it is a packet destined for some other peripheral device that is further along in the initialization process. In this event control is returned to process 724 for the fetching of the next packet. If, alternately, an affirmative determination is reached, i.e. that packet with a group ID is the first packet type 110 as opposed the second packet 170 sent by the server, then control is passed to process 738.

In process 738 the source address of the incoming packet, i.e. the unique network address of the server 102 is stored in a specific location in cache and control is then passed to process 740. In process 740 the transitory code 408 (see FIG. 4A) is extracted from the payload and stored in a specific portion of cache. Control is then passed to process 742 in which a jump from local memory kernel BIOS to the transitory code, is implemented. Control is then passed to process 744 in which the kernel BIOS has completed its functionality.

In FIG. 7B, processing is executed out of code stored in cache rather than BIOS. The temporarily disabled cache performs as a volatile memory and contains the transitory code received in the initial packet 110 from the server (see FIG. 1A). The transitory mode 750 begins with process 752 starting at the portion of cache in which the transitory code is stored. Control is then passed to process 754. In process 754 functional code segments in the transitory code cause the CPU 200 to obtain the processor ID 142A and the peripheral device ID 130. Those device IDs can be determined in a number of manners. In the embodiments discussed above, the device ID 142A is fabricated as part of the CPU, e.g. as a read only register thereof. Alternately the ID could be anywhere on the chip including local memory such as electrically programmable electrically erasable programmed read only memory (EEPROM) 202. Alternately, the chip ID could be formed by an external series of DIP switches or fusible links. In an embodiment of the invention the ID is part of the multi-mode chip at time of manufacture. In an alternate embodiment of the invention the ID is assigned during installation. The same features can be provided for device ID 130. That also could be a dedicated memory, e.g. EEPROM, DIP switches or fusible links. In an alternate embodiment of the invention the device IDs, rather than being hard coded, are discovered by processes initiated by the transitory code and carried out by the CPU 200. The CPU, for example, might conduct consecutive reads and writes to specific locations in its memory map or I/O space and determine the type of response that was elicited. Based on that response it could determine what type of peripheral device it was connected to and the characteristics of the multi-mode chip. Control is then passed to process 756.

In process 756, the CPU 200 generates a random number which may be a function of the time since boot up. As discussed above, this random number should be of a sufficient number of bits to ensure that it will not be matched by the random number generated by any of the other peripheral devices which may be responding to the same packet 110 from the server 102 (see FIG. 1A). Control is then passed to process 758. In process 758 the CPU 200 reads the group ID 242 which is located in non-volatile local memory 202. In alternate embodiments the invention a group ID might be in a totally separate medium access controller (MAC) connected to the CPU. Control is then passed to process 760. In process 760, the CPU 200 reads the portion of cache memory which contains the source address that was extracted by the kernel bios and discussed above in FIG. 7A. That source address corresponds to the unique network address of the server 102 obtained from the initial packet 110 by the kernel bios. Control is then passed to process 762. In process 762 simple network interface functions including medium access control (MAC) and packet assembly and disassembly (PAD) are performed by the CPU 200. Control is then passed to the first of those functions as executed in subsequent process 764.

In process 764 the payload is assembled including the random number generated in process 756. In the source and destination address field of the payload respectively, the group ID 242 (see FIG. 2) and the source address field 306 (see FIG. 4A) are placed. The group ID 242 may be fabricated into the chip at time of manufacture. The destination address is obtained from the source address field of the incoming packet 110. The packet is sent to the server 102 in process 766.

Next control is passed to process 768 for the processing of incoming packets from the network 100. Each of those packets is analyzed in successive decision process 770–774. In process 770 a determination is made as to whether the packet contains a destination address corresponding to the group ID of the peripheral device. If it does then control is passed to process 772. In process 772 a determination is made as to whether the packet is of the first or second type. The first packet type 110 (See FIGS. 1A, 4A) containing only transitory code or the second type of packet 170 (See FIGS. 1C, 4C). The second packet type contains as discussed above, a random number, and OS and/or application and storage code. If it is the second type of packet and does contain a random number then control is passed to decision process 774.

In decision process 774 a determination is made as to whether the random number in the packet payload matches the random number generated by the CPU 200. If the random number in the packet matches the random number generated by the CPU, then control is passed to process 776. In process 776 the payload of the incoming packet 170A is obtained and from it are parsed the unique network address field 440, the storage code 450, the OS code 254. The storage code is placed in cache at a specific location, the operating system is placed in cache at another specific location and the network address field 440 is stored in local memory 202 as network ID 244. In alternate embodiments in the invention, the network ID would be sent to a separate network interface device. Control is then passed to process 778. In process 778 the CPU 200 jumps to the portion of cache memory which contains the storage code and begins executing that code. Then control is passed to process 780.

In process 780, the storage code causes the CPU 200 to transfer successive lines of operating system code from cache memory 250 (see FIG. 2) to main memory 220 (see FIG. 2). Additionally, the unique network ID is also transferred to a non-volatile memory e.g. main memory 220. In alternate embodiments of the invention the unique network address may be stored in any non-volatile memory on either the chip or peripheral device or a network interface. Once the entire operating system has been transferred control is passed to process 782.

In process 782 the image of the OS is loaded from the main memory into RAM 226. Then, in process 784 the cache is enabled by, for example, causing the CPU to write to a specific pin having the connection to the cache controller 248 converting to runtime mode by enabling the cache controller. Control is then passed to process 786 in which the transitory code is finished and the normal operation of the multi-mode chip and peripheral device commences.

As will be obvious to those skilled in the art, and without departing from the teachings of the invention, the operating system could be more than 1500 bytes in length provided only that the transitory code initiated additional processes to retrieve subsequent packets and transfer those to main memory.

In an alternate embodiment of the invention, in which only one peripheral device is connected to the network at a time, many of the procedures described and discussed above, could work with the device that was hooked up singly to the network or to a plurality of devices hooked up concurrently on the network.

It is also possible to use the described method to send a simple instruction to the CPU to activate it and to make it perform simpler things, such as activating a machine or switching a light on or off.

A processing circuit formed by the IC according to the invention and external units connected thereto is suited for the use in different network peripheral equipment, such as print servers and CD-ROM servers.

The invention has above been illustrated in an exemplifying manner and a number of improvements are possible within the scope of protection of the appended claims.

In the preferred embodiment of the invention, the CPU receives a first start-up program and thereafter executes the instructions switching the IC 1 into the initiating mode. However, in alternative embodiments, the NIC and/or the cache memory can have the ability to switch themselves into the initiating mode.

By the IC being able to receive a second start-up program via the network port and by active receiving of the second start-up program the IC is easy to load during the manufacturing process, as well as during its lifetime thereafter. Particularly, the last feature is of great advantage when the processing circuit is used in network peripheral equipment, because it can be upgraded or changed via the network, when in the initiating mode.

However, the invention is not limited to the second start-up program being received via the network port. Other ports on the IC can be used for the loading of the processing circuit, such as a parallel port, a serial port or an auxiliary loading port. In these cases the program preferably has a predetermined size. Thereby other interface control units might be used, or even no control units at all can be used, if for example the second start up program is transmitted immediately to the cache memory unit.

What is claimed is:

1. A method for enabling peripheral devices coupled by a network to a server, and the method comprising:

storing on the server operating systems each associated with a corresponding type of peripheral device;

generating a random number at each one among a first group of the peripheral devices and with each of the random numbers uniquely identifying a corresponding one among the first group of peripheral devices;

sending a peripheral identification network packet from each one among the first group of the peripheral devices to the server and with each of the peripheral identification network packets including a non-unique source address corresponding with the first group and a payload with the corresponding random number generated in said act of generating;

broadcasting from the server, responsive to the sending act, a plurality of server download network packets each including a non-unique destination address corresponding with the first group and a payload with a corresponding one of the random numbers sent in said sending act, a selected one among the operating systems stored in said storing act which corresponds in type with, and a unique network address for the peripheral device uniquely identified by the corresponding one of the random numbers; and downloading at each of the first group of peripheral devices the operating system and unique network address from the payload of a selected one of the plurality of server download network packets which includes the random number which matches the random number generated in said generating act.

2. The method of claim 1, further comprising the acts prior to the generating act of:

broadcasting from the server a server query network packet including a non-unique destination address corresponding with the first group, a unique source address corresponding with the server and a payload with transitory code for generating the random number in said generating act; and downloading at each of the first group of the peripheral devices the transitory code from the payload of the server query network packet.

3. The method of claim 2, further comprising:

storing the transitory code, downloaded in said act of downloading transitory code, in volatile memories each associated with a corresponding one of the first group of the peripheral devices;

storing the operating system, downloaded in said act of downloading the operating system, in non-volatile memories each associated with a corresponding one of the first group of the peripheral devices; and enabling each of the volatile memories as a cache for the corresponding non-volatile memories subsequent to the storage of the operating system in said act of storing the operating system in non-volatile memories.

4. The method of claim 1, wherein said act of broadcasting from the server a plurality of server download packets, further comprises:

generating at the server the unique network address for each of the first group of peripheral devices.

5. The method of claim 1, wherein said act of sending a peripheral identification network packet further comprises:

adding a non-unique peripheral device type identifier identifying a corresponding one among the first group of peripheral devices into the payload of each of the peripheral identification network packets.

6. A means for enabling peripheral devices coupled by a network to a server, and the means comprising:

means for storing on the server operating systems each associated with a corresponding type of peripheral device;

means for generating a random number at each one among a first group of the peripheral devices and with each of the random numbers uniquely identifying a corresponding one among the first group of peripheral devices;

means for sending a peripheral identification network packet from each one among the first group of the peripheral devices to the server and with each of the peripheral identification network packets including a non-unique source address corresponding with the first group and a payload with the corresponding random number generated by said means for generating;

means for broadcasting from the server a plurality of server download network packets each including a non-unique destination address corresponding with the first group and a payload with a corresponding one of the random numbers sent by said means for sending, a selected one among the operating systems stored by said means for storing which corresponds in type with, and a unique network address for the peripheral device uniquely identified by the corresponding one of the random numbers; and means for downloading at each of the first group of peripheral devices the operating system and unique network address from the payload of a selected one of the plurality of server download network packets which includes the random number which matches the random number generated by said means for generating.

7. The means for enabling of claim 6, further comprising:

means for broadcasting from the server a server query network packet including a non-unique destination address corresponding with the first group, a unique source address corresponding with the server and a payload with transitory code for generation of the random number by said means for generating; and means for downloading at each of the first group of the peripheral devices the transitory code from the payload of the server query network packet.

8. The means for enabling of claim 7, further comprising:

means for storing the transitory code, downloaded by said means for downloading transitory code, in volatile memories each associated with a corresponding one of the first group of the peripheral devices;

means for storing the operating system, downloaded by said means for downloading the operating system, in non-volatile memories each associated with a corresponding one of the first group of the peripheral devices; and means for enabling each of the volatile memories as a cache for the corresponding non-volatile memories subsequent to the storage of the operating system by said means for storing the operating system in non-volatile memories.

9. The means for enabling of claim 8, wherein the means for broadcasting from the server a plurality of server download packets, further comprises:

means for generating at the server the unique network address for each of the first group of peripheral devices.

10. The means for enabling of claim 6, wherein said means of sending a peripheral identification network packet further comprises:

means for adding a non-unique peripheral device type identifier identifying a corresponding one among the first group of peripheral devices into the payload of each of the peripheral identification network packets.

\* \* \* \* \*